Patented Mar. 26, 1929.

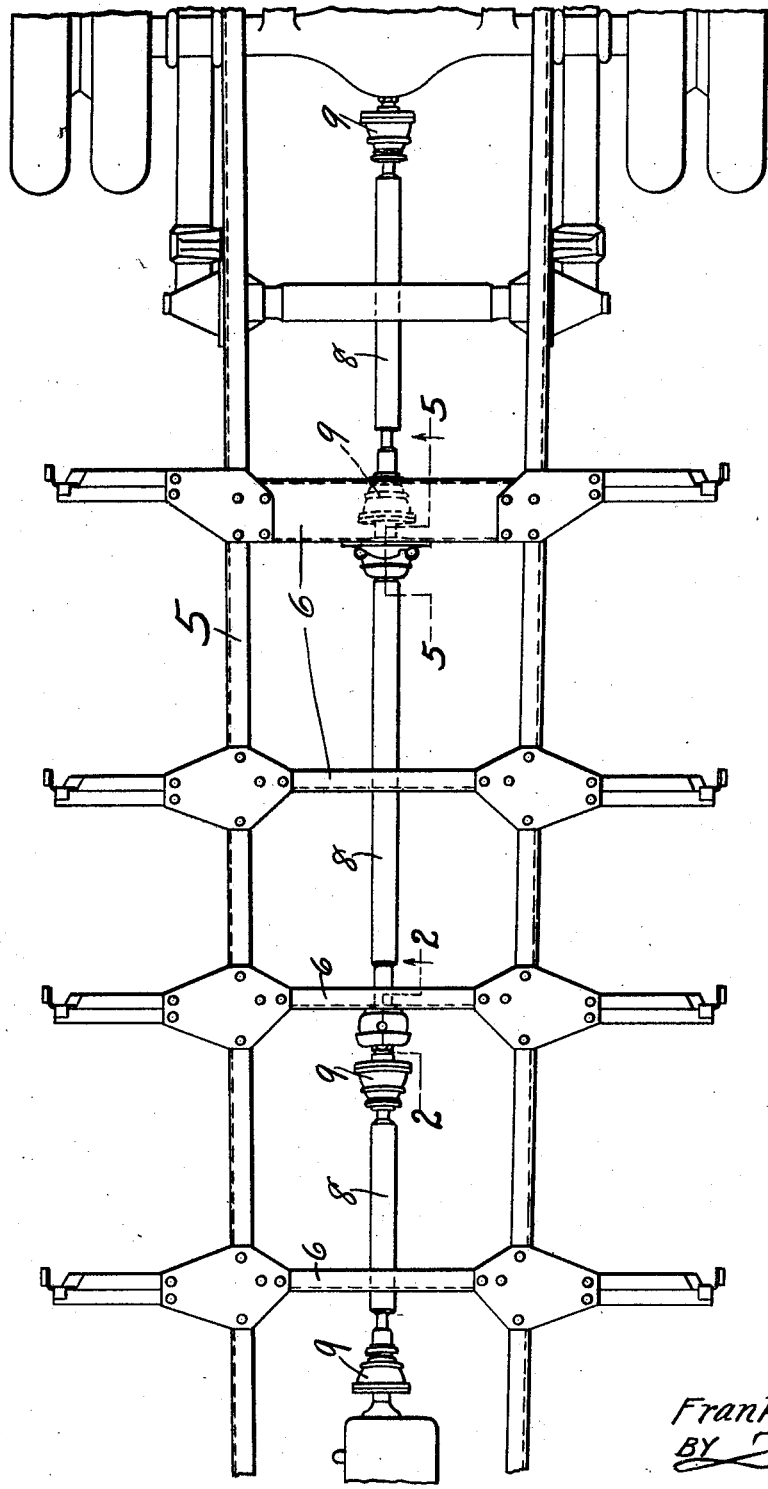

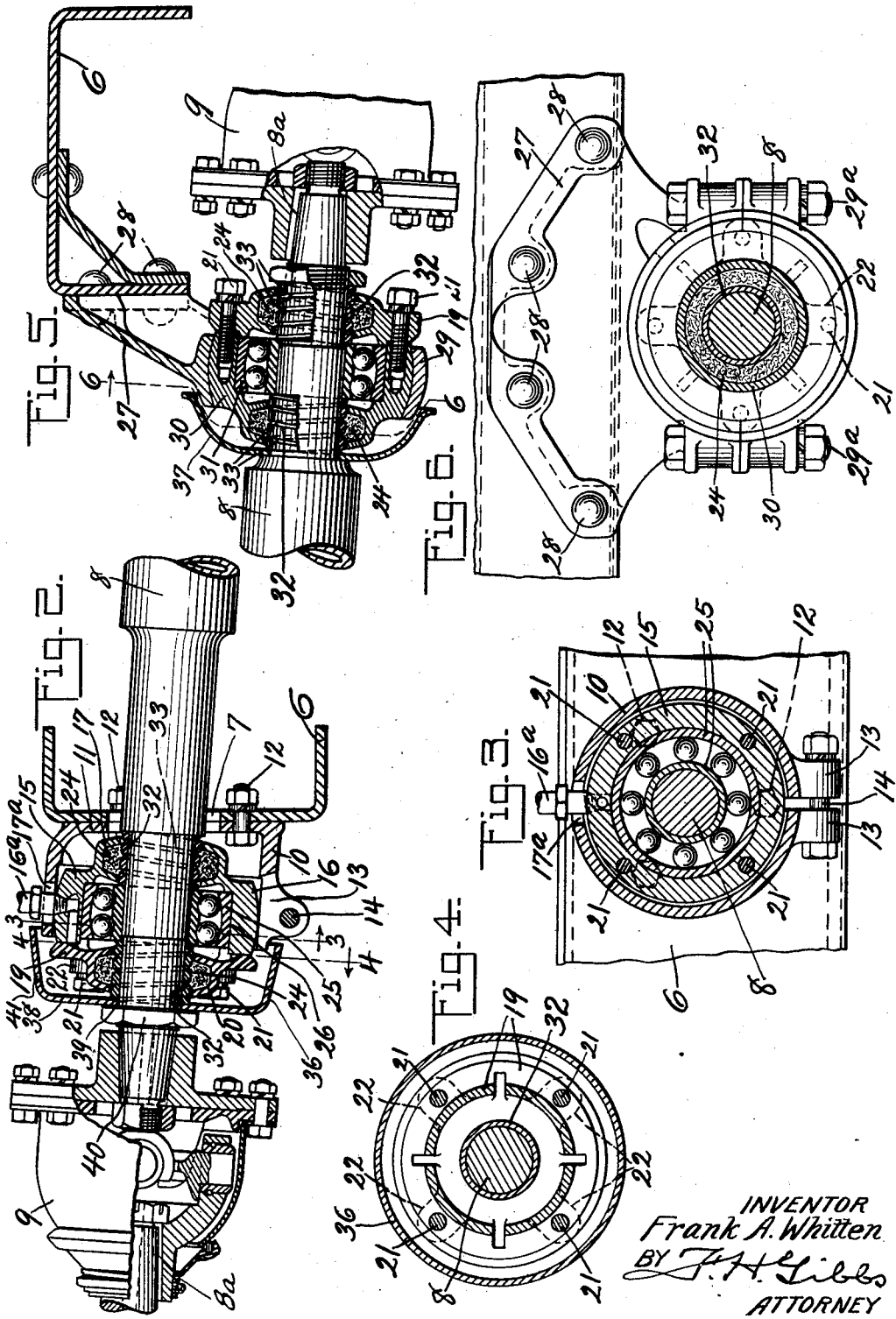

1,706,505

UNITED STATES PATENT OFFICE.

FRANK A. WHITTEN, OF DETROIT, MICHIGAN, ASSIGNOR TO AMERICAN CAR AND FOUNDRY MOTORS COMPANY, OF NEW YORK, N. Y., A CORPORATION OF DELAWARE.

PROPELLER-SHAFT-BEARING MOUNTING.

Application filed February 9, 1927. Serial No. 166,911.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a plan view of an automobile chassis illustrating the application of my invention;

Fig. 2 is a vertical longitudinal sectional view taken on line 2—2 of Fig. 1;

Fig. 3 is a vertical transverse sectional view taken on line 3—3 of Fig. 2;

Fig. 4 is a similar view taken on line 4—4 of Fig. 2;

Fig. 5 is a vertical sectional view taken on line 5—5 of Fig. 1;

Fig. 6 is a transverse sectional view taken on line 6—6 of Fig. 5.

My invention relates to automobile propeller shafts, and more particularly to a propeller shaft bearing mounting or support.

The principal object of this invention is to provide a propeller shaft bearing mounting wherein the propeller shaft sections are always retained in proper alined position with respect to the cross members of the chassis regardless of the twisting or distortion of the chassis incident to the passage of the vehicle over an uneven surface or the uneven distribution of the load on the vehicle.

Further, my invention contemplates a shaft mounting of this type which is of such construction as to preclude dirt, rain and other destructive elements and retain the necessary lubricant within the bearings.

The invention also provides a universal bearing support for permitting universal movement about the bearings, thus keeping the shaft sections in true alinement and compensating for twisting of the vehicle chassis, and thereby obviating reaming out or mutilation of the packings at the ends of the bearing which permits the entrance of foreign elements and escape of lubricant around the shaft.

Another object is to provide a propeller shaft bearing mounting or support which may be readily assembled or disassembled for the purpose of repairs or inspection.

It is also within the provisions of this invention to provide oppositely acting lubricant conveyors for the bearings, which incident to the rotation of the shaft carry any lubricant that has flowed from the bearing in an outward direction, back to the latter. The invention further contemplates a rotary bearing shield or enclosure which by centrifugal action throws rain and mud away from the bearing to keep the latter free of such destructive elements.

Referring to my invention in detail, an automobile chassis is designated in its entirety at 5 and includes the usual transverse or cross members 6, certain of which have longitudinally alined propeller shaft openings 7. In this instance three propeller shaft sections 8 are employed and are connected together by the usual universal couplings 9 to which the said sections are keyed as indicated by 8ª in Figs. 2 and 5 of the drawings.

In order to compensate for the twisting or distortion of the vehicle chassis incident to the latter traversing an uneven surface, and thereby keep the propeller shaft sections in proper alinement, I provide the rear bearing mounting or support shown in Fig. 5, and the forward bearing mounting or support disclosed in Fig. 2, which are arranged to permit the cross members 6 to move axially and longitudinally to compensate for this twisting or distortion of the chassis.

The forward bearing mounting comprises a circular split ring annulus 10, having an inwardly directed annular flange 11 at its inner end received on the forward end of the intermediate shaft section 8 in registration with the adjacent opening 7 and attached to the cross member by bolts or other fastenings 12. Parallel ears 13 are carried by the free ends of this ring or annulus 10, and receive a clamping bolt 14 for the purpose of adjusting the ring or annulus to the bearing container 15 received therein, and positioned on the shaft section. This ring or annulus 10 is arranged for longitudinal axial shifting on the bearing container 15 to compensate for twisting of the frame. To permit these movements and allow the usual lubricant supply pipe 16ª to communicate with the bearing, an elongated opening 17ª surrounding the lubricant supply pipe is provided in the ring or annulus 10. This bearing container 15 has a convex surface 16, and is cast with a channel shaped stuffing box 17 at its rear end. The forward end of the bearing container 15 is open, and is normally closed by circular cover 19 formed with a channel shaped stuffing box 20. The cover or closure 19 is detachably held to the bearing container 15 by bolts 21 engaging radial ears 22 on the cover and circumferentially spaced openings in the wedge of the bearing container. Compressible packing elements 24 are received in the channel shaped stuffing boxes 17 and 20. Supported within the bearing container is a conventional roller bearing 25, the inner race of the latter being associated with the shaft section and rotatable therewith, while the outer race is held against rotation within a circular recess 26 in the bearing container.

The rear bearing mounting or support comprises an angular plate or casting 27 secured to the adjacent cross member 6 by fastenings 28. This plate or casting 27 is cast with a concavo-convex halved or sectional ring or socket 29 whose parts are detachably held together by fastenings 29$^a$. Received in this ring or socket 29 is a bearing container 30 identical to the bearing container 15. Like the bearing container 15 this bearing container 30 houses a conventional roller bearing assembly 31, and a conventional form of lubricant plug (not shown) similar to that shown at 16$^a$ is provided for supplying lubricant to the parts.

For the purpose of carrying any lubricant that may tend to work outwardly from the bearings 25 and 31, sleeves 32 are received within the bearing containers upon opposite sides of the rotatable race of the latter, and are received on the ends of the shaft section for rotation therewith. These sleeves 32 extend from the opposite ends of the rotatable race of the bearings to points slightly beyond the channel shaped stuffing boxes, and are provided with oppositely convoluted lubricant conducting grooves 33, which upon rotation of the shaft force any lubricant that passes from the roller bearings rearwardly into the latter.

It will be seen that when the chassis twists or gives as usual in travelling over a rough roadway, the concavo-convex ring or socket will move universally on the bearing container 30, thus relieving the same of strain and obviating disalinement of the shaft sections. This bending or twisting of the chassis causes the front part thereof to shift longitudinally and axially. This condition is compensated for by reason of the ring or annulus 10 riding longitudinally on the bearing container 15 and turning axially thereon. With the shaft sections positively held in alinement it is impossible to mutilate or ream out the compressible packing elements 24 as is the case with the usual fixed bearings.

It is advantageous to exclude mud, water and other foreign elements from the bearing retainers and associated parts, and to that end the invention provides shields 36 and 37 for the two bearing containers which are fixed to the ends of the intermediate shaft section 8 in advance of the bearing mountings, and surround the annulus 15 and concavo-convex ring 29 respectively. The shield 36 comprises a disk 38 having a central opening 39 to take the shaft, and is held between a nut 40 and an outer end of one of the sleeves 32. A flared rearwardly extending annular flange 41 is formed with the disk 38 and encircles the outer end of the ring or annulus 15. The shield 37 is similarly constructed, but is dished or concavo-convex in cross section so as to conform to the shape of the concavo-convex annulus 29. In this instance, the shield is held between a shoulder on the end of the shaft section and the adjacent end of one of the sleeves 32.

What is claimed is:

1. Means for mounting a propeller shaft in a chassis of an automobile to permit relative axial and longitudinal movement of the chassis incident to jarring of the latter, including floating bearing supporting means attached to the chassis, and through which the shaft extends.

2. In a motor vehicle, a vehicle chassis, and a propeller shaft suspended in a floating support depending from the chassis to permit natural chassis strain variation and axial and longitudinal movement of the propeller shaft, and thereby prevent disalinement while the vehicle is in motion.

3. In a motor vehicle, a chassis, a propeller shaft, supports for the shaft bearings rigid with the chassis and loosely receiving the shaft bearings to permit movement between the latter and chassis whereby to maintain alinement of the shaft chassis strain variations while the vehicle is in motion.

4. In a motor vehicle, a chassis, and supports for the shaft bearings attached to the chassis and loosely receiving the shaft bearings to permit axial and longitudinal distortion of the chassis incident to the vehicle passing over an uneven surface.

5. In a motor vehicle, a chassis, a plurality of longitudinally alined brackets, shaft bearing containers supported in the brackets, one of which being capable of slidable and axial movement and the other being capable of universal movement, anti-friction bearings supported in the bearing containers and adapted to receive a propeller shaft passed through the bearing containers.

6. The combination with a motor vehicle chassis, of means for supporting one of the shaft sections of a propeller shaft from the cross members of the chassis to permit the chassis to have natural movements incident to travel of the vehicle, without disalinement of the shaft section, comprising a plurality of shaft bearing containers supported from the cross members, one of which being arranged for universal movement and another arranged for longitudinal and axial movement.

7. A propeller shaft mounting comprising a concavo-convex annulus rigidly attached to part of an automobile chassis, a convex circular housing mounted in the annulus to permit universal movement of the annulus incident to the natural movement of the vehicle chassis and adapted to receive an anti-friction device of a propeller shaft.

8. The combination with an automobile chassis, of a bracket attached to one of the cross members thereof, a concavo-convex annulus cast with the bracket, a convex circular housing universally mounted in the annulus, and arranged to loosely receive and retain a propeller shaft and its bearing to permit axial and longitudinal movement thereof.

9. In a motor vehicle, a chassis, a sectional propeller shaft, couplings connecting the sections of said shaft, and means mounting the shaft to permit relative movement thereof with respect to the chassis and to retain the sections in alinement comprising brackets secured to the chassis, and anti-frictionally mounted bearing elements engaging the sections intermediate the ends thereof and universally retained in said brackets.

10. In a motor vehicle, a chassis having transverse members, a propeller shaft, brackets carried by the transverse members, and bearings supporting the propeller shaft intermediate the ends thereof and mounted for universal movement in the brackets to permit axial and longitudinal movement of the shaft relative to the chassis.

11. In a motor vehicle, a chassis having transverse members, a propeller shaft, brackets carried by the transverse members, bearings supporting the propeller shaft intermediate the ends thereof and mounted for universal movement in the brackets to permit axial and longitudinal movement of the shaft relative to the chassis, and means on said propeller shaft for retaining lubricant in the bearings.

12. In a motor vehicle, a chassis having transverse members, a sectional propeller shaft having the sections thereof extended through the transverse members, couplings connecting the sections intermediate the transverse members, and universal bearings supporting the shaft sections intermediate the ends thereof.

In witness whereof I have hereunto set my hand.

FRANK A. WHITTEN.